Figure 1:
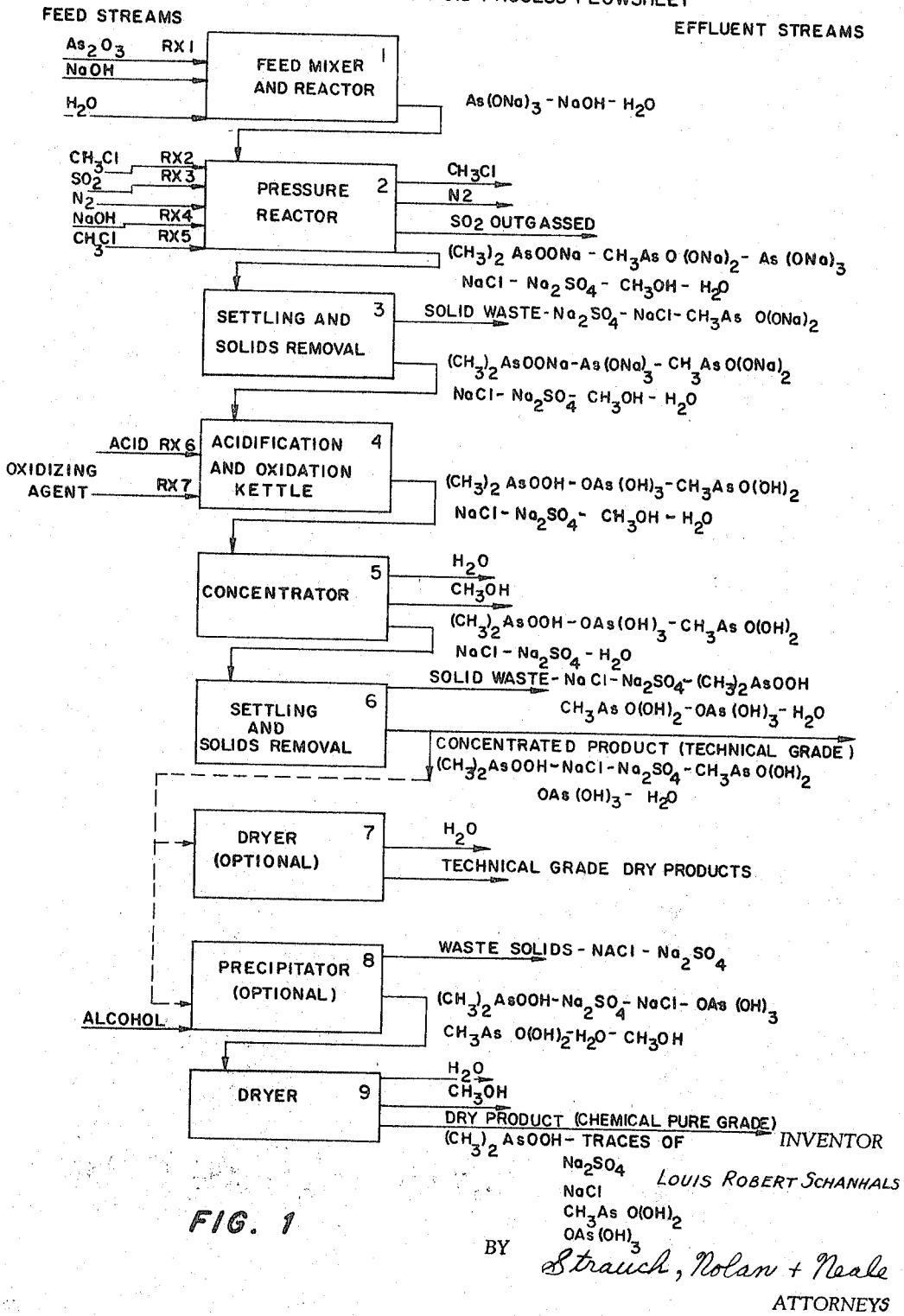

May 30, 1967 L. R. SCHANHALS 3,322,805
PROCESS FOR THE MANUFACTURE OF LOWER ALKYL ARSINIC
ACIDS AND ALKALI METAL SALTS THEREOF
Filed Aug. 8, 1963 2 Sheets-Sheet 1

INVENTOR
LOUIS ROBERT SCHANHALS
BY Strauch, Nolan + Neale
ATTORNEYS

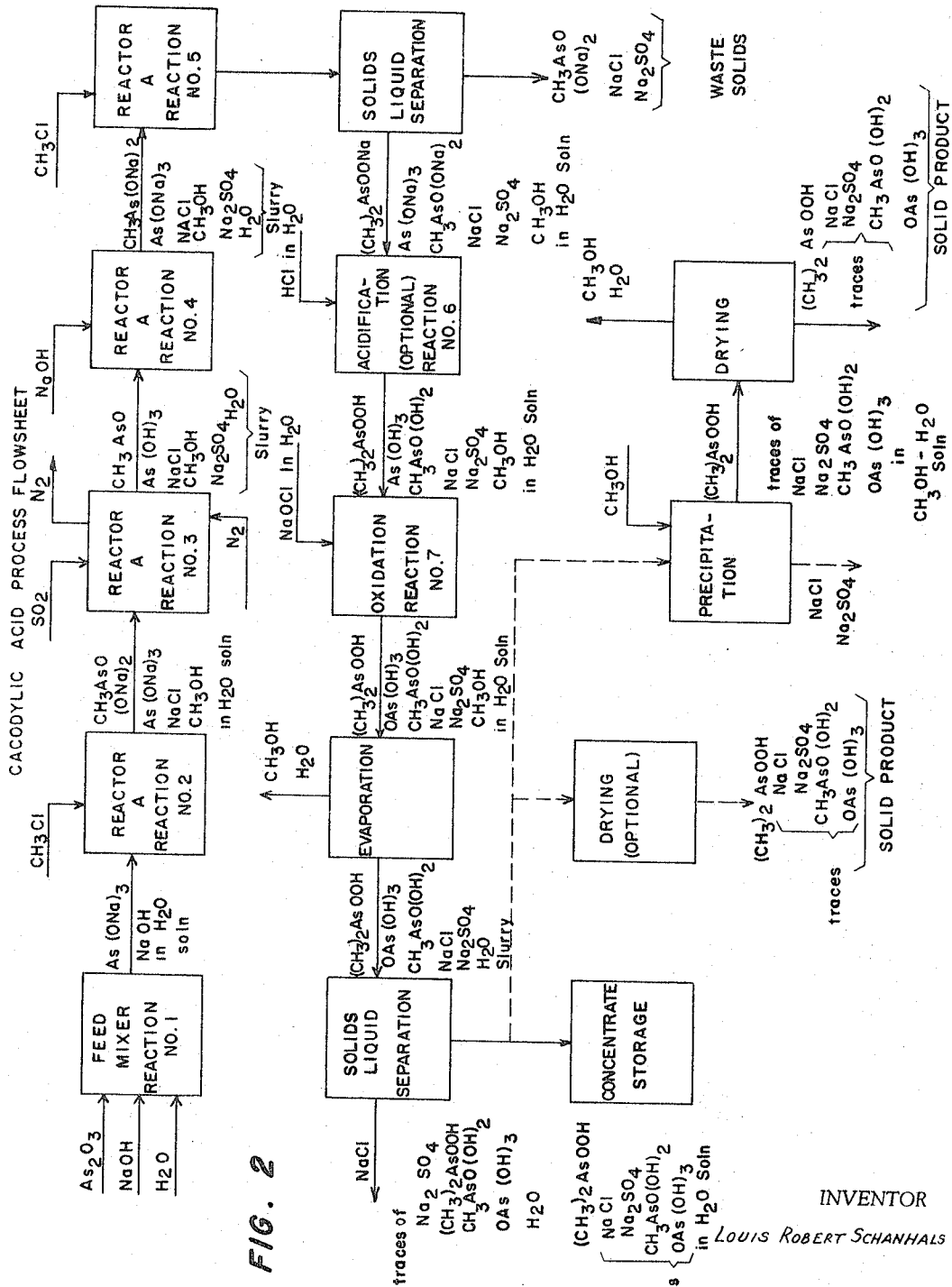

United States Patent Office 3,322,805
Patented May 30, 1967

3,322,805
PROCESS FOR THE MANUFACTURE OF LOWER ALKYL ARSINIC ACIDS AND ALKALI METAL SALTS THEREOF
Louis Robert Schanhals, Marysville, Ohio, assignor to The O. M. Scott & Sons Company, Marysville, Ohio, a corporation of Ohio
Filed Aug. 8, 1963, Ser. No. 300,848
20 Claims. (Cl. 260—442)

This invention relates to improved processes for making arsinic acids and salts thereof. More particularly it relates to improved, commercially feasible processes for converting arsenic trioxide to lower alkyl arsinic acids and their salts. Arsinic acids and salts that may be made by this process include: dimethyl arsinic acid, diethyl arsinic acid, ethyl methyl arsinic acid, mixtures of the foregoing acids, and the alkali salts thereof including lithium, sodium, and potassium and the like.

One prior process for the production of dimethyl arsinic acid involves sublimation of arsenic trioxide in the presence of acetic acid and potassium acetate to form cacodyl and cacodyl oxide (Cadet's liquid). The latter is then further oxidized to dimethyl arsinic acid. The process of making Cadet's liquid and related compounds is described in United States Patents Nos. 2,756,245 and 2,531,487 and in 54 Chemistry and Industry 854–5 (1944). This process is uneconomic because the sublimation rates are very slow and the conversion relatively low. Further, the starting materials are uneconomic for a commercial process.

Another prior process for making arsinic acids is described by V. Auger in 137 Compt rend 925 (1903) and abstracted in Organic Arsenical Compounds 79 (1923) by G. W. Raiziss and J. L. Gavron. The chemistry of this process is, in some respects, similar to that herein disclosed. However, Auger's extensive use of alcohol as a reaction media and his stepwise purification would be uneconomic in a commercial process. Further, his process involves several steps which are not required to effectively carry out the present invention. Also, Auger's use of methyl iodide as the methylating agent prevents the direct isolation of the free arsinic acid for, upon acidification, the liberated hydriodic acid formed immediately reduces the arsinic acid. Further, methyl iodide is an inordinately expensive reactant for commercial processes. Also, in this process, the arsinic acids are difficult to isolate.

Another prior process for producing arsinic acid is reported in 44 Journal of the American Chemical Society 811. This process comprises the steps of reacting alkyl dichloroarsine with sodium hydroxide to make disodium alkyl arsenite. The latter is refluxed with an alkyl halide and subsequently acidified to obtain the alkyl arsinic acid. This process differs from that of the present invention in regard to its starting material, alkyl dichloroarsine. The alkyl dichloroarsines are such highly toxic materials that they were used as war gases in World War I. By avoiding their use, the process of the present invention is inherently materially safer than that described above.

Dialkyl arsinic acids may also be prepared from secondary trivalent aliphatic arsenicals by oxidation with mercuric oxide or oxygen; from alkyl dichloroarsines and bromine in the presence of water; or by the action of mercuric oxide upon alkyl arsine oxides. These processes have been carried out in the laboratory but, because of the expensive reactants required and other factors, are not commercially feasible.

Another disadvantage of the above-discussed prior art processes for producing arsinic acids, as pointed out in 44 Journal of the American Chemistry Society 811, is that none of these processes is a general method of producing arsinic acids. The Cadet reaction discussed above, for example, can only be utilized to produce dimethyl arsinic acid. The other reactions are similarly limited.

A further problem with the prior methods of arsinic acid production is that trivalent arsenic compounds are present in the final product. Trivalent arsenic compounds are generally the major cause of the foul odor of organic arsenical compositions and are far more poisonous than the pentavalent arsenicals which are the subject of this invention. For example, as little as 0.05 part of arsine ($AsH_3$,) per million parts air is deadly to humans. In the process of this invention, the starting material is a trivalent arsenical and many trivalent intermediates are formed in the various steps of the process. It has been found, however, that the finished product may, if desired, be freed of the odiferous and toxic trivalent arsenicals by the addition of a strong oxidizing agent. This novel step is simple and economic and of great value in reducing the smell and mammalian toxicitiy of the final product.

It is therefore one object of this invention to provide novel improved processes for producing lower alkyl arsinic acids and their salts.

It is a further object of the present invention to provide novel improved processes for the production of lower alkyl arsinic acids and their salts which are economically feasible for large-scale commercial production.

It is another object of this invention to provide novel improved processes for the commercial manufacture of alkyl arsinic acids and their salts in which trivalent arsenicals are eliminated from the final product.

It is a further object of the present invention to provide lower alkyl arsinic acid and salt compositions which are substantially free of trivalent arsinic compounds.

Yet another object of the present invention resides in the provision of novel improved processes for the commercial manufacture of alkyl arsinic acids and their salts which utilize starting materials having a materially lower degree of toxicity than those employed in common prior art processes.

It is a further object of this invention to provide novel processes of producing alkyl arsinic acids and their salts which may be employed to produce a variety of these compounds.

Other objects and further novel features of the present invention will become more fully apparent from the appended claims and as the ensuing detailed description and discussion proceeds in conjunction with the accompanying drawing, in which:

FIGURE 1 is a flowsheet particularly illustrating the process equipment employed in the novel processes of the present invention; and FIGURE 2 is a flowsheet illustrating the steps and chemical reactions involved in the novel processes of the present invention.

In order to simplify the description of the present invention, it will be described in the context of producing dimethyl arsinic acid (cacodylic acid) and its sodium salt. The process for making these materials is merely typical of the processes of the present invention and the description below is therefore not meant to be limiting, but to broadly disclose the general methods of lower alkyl arsinic acid and salt production provided by this invention.

With reference to FIGURE 1, solid arsenic trioxide is mixed with solid sodium hydroxide and water in mixer 1. The materials react to produce sodium arsenite as shown in the equation below:

*Reaction 1*

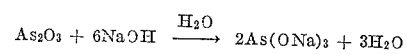

The concentration of the ingredients in mixer 1 is 1.32 lbs. $As_2O_3$ per gallon of solution and 2.085 lbs. NaOH per gallon of solution. Other solution concentrations are suitable, but the above is preferred. Other hydroxides such as potassium and lithium may be used in Reaction 1, but sodium hydroxide is preferred for economy and ease of handling. A solution of sodium hydroxide may also be used in this step, but the solid hydroxide is preferred as its heat of solution generates heat and so minimizes the heat required to get the reaction mass to the desired temperature for the subsequent reaction.

Sodium hydroxide in excess of the stoichiometric amount required for reaction is added in mixer 1. This is done because yields in Reaction 2 (shown below) are increased by the presence of sodium hydroxide. Excess sodium hydroxide must be also provided to compensate for that depleted by the hydrolysis reaction of the sodium hydroxide with the methyl chloride which competes with Reaction 2 below. This hydrolysis reaction proceeds as follows:

$$CH_3Cl + NaOH \xrightarrow{H_2O} NaCl + CH_3OH$$

After Reaction 1 is complete, the aqueous sodium arsenite solution containing excess sodium hydroxide is fed into pressure reactor 2. The solution is brought to the desired temperature, which is between 125° F.–235° F. (155° F.–185° F. being preferred), and reacted under pressure with superheated methyl chloride to form disodium methyl arsonate (DSMA), the reaction proceeding as follows:

Reaction 2

$$As(ONa)_3 + CH_3Cl \xrightarrow{H_2O} CH_3AsO(ONa)_2 + NaCl$$

The rates of reaction of methyl chloride with both sodium arsenite and sodium hydroxide increase with temperature. It is therefore desirable to maintain the reaction at a temperature at which high DSMA rates and yields are afforded with the lowest amount of excess sodium hydroxide. This is best accomplished at a temperature of about 175° F. The pressure in the reactor may range between 55 p.s.i.g. and 200 p.s.i.g. A more efficient reaction is produced at pressures ranging between 105 and 200 p.s.i.g., and the best results are obtained at pressures of about 175 p.s.i.g. 90–97% yields (based on the arsenic) have been obtained in forty minutes at 175° F. and 175° p.s.i.g.

The two foregoing chemical steps of the present invention (which yield the intermediate, disodium methyl arsonate) are described in greater detail in United States Patents Nos. 2,442,372 and 2,695,306 which are hereby incorporated by reference. Surprisingly, however, it has been found that the methylation reaction will proceed better if carried out at the optimum pressures discussed above instead of at 60 p.s.i. as taught in the foregoing patents.

The DSMA solution produced by methylating the sodium arsenite is reacted with sulfur dioxide gas in pressure reactor 2 to produce methyl arsineoxide. By using $SO_2$ gas, substantially better results are achieved than is possible by using sulfurous acid as has heretofore been proposed. This reaction proceeds as follows:

Reaction 3

$$CH_3AsO(ONa)_2 + SO_2 \xrightarrow{H_2O} CH_3AsO + Na_2SO_4$$

The reaction is very rapid at temperatures below 200° F. and at any pressure. After the reaction is complete (5–15 minutes), the excess $SO_2$ is outgassed using an inert gas, preferably nitrogen.

The outgassing and subsequent blanketing with inert gas is of great importance in obtaining high yields of cacodylic acid. This is because air oxidation of methyl arsineoxide and its salts occurs very readily and must be prevented to avoid the loss of methyl arsineoxide. This oxidation reaction is as follows:

$$2CH_3AsO + O_2 + 2H_2O \rightarrow 2CH_3AsO(OH)_2$$

If an inert atmosphere is not maintained over the solution, high losses of yield will result. Other inert gases such as $CO_2$, helium, and the like may be used, but nitrogen is preferred.

With the inert atmosphere still blanketing the solution, sodium hydroxide is added to the reaction mixture in pressure reactor 2. This reacts with the methyl arsineoxide to form disodium methyl arsenite as follows:

Reaction 4

$$CH_3AsO + 2NaOH \xrightarrow{H_2O} CH_3As(ONa)_2 + H_2O$$

An excess of sodium hydroxide over the stochiometric amount is added in this step to increase the yield of disodium methyl arsenite from Reaction 4. As was the case with Reaction 1 above, other caustic materials, such as potassium and lithium hydroxide and the like, may be used.

After Reaction 4 is complete, the disodium methyl arsenite solution in reactor 2 is brought to reaction temperature and reacted with superheated methyl chloride to form sodium dimethyl arsinate, the reaction proceeding as follows:

Reaction 5

$$CH_3As(ONa)_2 + CH_3Cl \xrightarrow{H_2O} (CH_3)_2AsO(ONa) + NaCl$$

This reaction is preferably carried out at temperatures between 75° and 200° F. and pressures between 40 p.s.i.g. and 175 p.s.i.g. Better yields are obtained at temperatures between 75° and 180° F. The best temperature and pressure for this reaction are 175° F. and 150 p.s.i.g.

The products of Reactions 2–5 (all of which are carried out in pressure reactor 2) are present in a slurry which is pumped out of the reactor. The solids are then removed by conventional methods, preferably by pumping the reaction products to a settling tank 3 and cooling them. Most of the $Na_2SO_4$, some NaCl, and some reaction by-products precipitate in reactor 2. Residual amounts remaining in solution precipitate out in the settling tank as the solution cools. The precipitated solids may then be dewatered using a filter, centrifuge, or similar unit. The mother liquor and the liquid phase remaining in the settling tank are pumped to reactor 4.

The liquid phase pumped into reactor 4 is a solution of the sodium salt of dimethyl arsinic acid (sodium dimethyl arsinate). If the desired product of the process is the salt, the acidification step described next is omitted and the solution preferably processed as described below in conjunction with reaction 7.

In reactor 4, the sodium dimethyl arsinate solution from settling tank 3 is acidified to produce dimethyl arsinic (cacodylic) acid from its sodium salt. Suitable acids including sulfuric, nitric, phosphoric, and the like may be used in the acidification step, but hydrochloric is preferred. The typical acidification reaction involved is shown below with HCl.

Reaction 6

$$(CH_3)_2AsO(ONa) + HCl \xrightarrow{H_2O} (CH_3)_2AsO(OH) + NaCl$$

The temperature and pressure at which this reaction is carried out are not critical, and ambient conditions are preferably used for economy.

The preferred method of this invention utilizes an additional optional oxidation step to reduce the toxicity, odor, etc. of the reaction mass. Either the solution containing the arsinic acid or its salt may be oxidized by a suitable oxidizing agent. Examples of appropriate agents are: sodium hypochlorite, iodine, potassium permanganate, bromic acid, calcium hypochlorite, hypochlorous acid, hydrogen peroxide, and the like. A preferred oxidizing agent is sodium hypochlorite.

Typical reactions which occur in this novel oxidation step are as follows:

Reaction 7

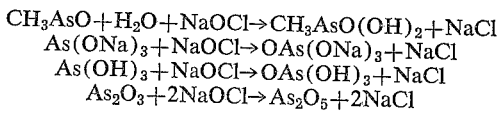

$$CH_3AsO + H_2O + NaOCl \rightarrow CH_3AsO(OH)_2 + NaCl$$
$$As(ONa)_3 + NaOCl \rightarrow OAs(ONa)_3 + NaCl$$
$$As(OH)_3 + NaOCl \rightarrow OAs(OH)_3 + NaCl$$
$$As_2O_3 + 2NaOCl \rightarrow As_2O_5 + 2NaCl$$

The temperature and pressure at which the oxidation reaction is carried out are not critical. Again, ambient conditions are preferred for economic reasons. The sequence of the acidification (Reaction 6) and oxidation steps can be reversed if desired with no change in the resulting end product.

The arsinic acid or salt solution is pumped to an evaporator or similar device 5 and water and methanol there removed, precipitating additional quantities of NaCl and $Na_2SO_4$. The solids may be removed from the solution by any conventional means. In the preferred process, the hot concentrate is first cooled in a settling tank and the insoluble impurities then removed. Additional solution is then removed from the solids by conventional devices such as filters or centrifuges and the mother liquor added to the solution removed in the settling tank.

The concentrated dimethyl arsinic acid or arsinic acid salt solution may be used as such as an intermediate or as a raw material in herbicides, defoliants and the like or may be additionally processed. For example, the solution may be further evaporated and dried in dryer 7 to give solid dimethyl arsinic acid or salt product which may be employed in the manufacture of the above-mentioned classes of products.

While the salts of the lower alkyl arsinic acids may be prepared as described heretofore, they may instead be made from the arsinic acid in an additional step if desired. In this step, the arsinic acid is dissolved in water and mixed with an alkali metal hydroxide such as potassium hydroxide, lithium hydroxide, sodium hydroxide or the like, and reacted in a suitable reactor to give the corresponding acid salt. This reaction may be carried out under ambient conditions or at temperatures up to 225° F. The pressure and temperature are not critical. Two typical reactions are shown below:

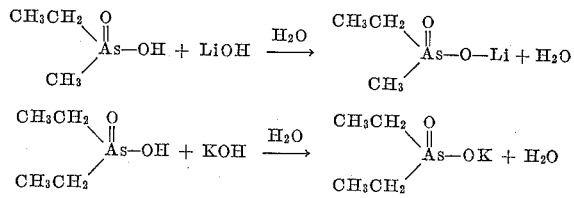

Below are specific examples of the preferred processes of this invention:

EXAMPLE 1

*Cacodylic (dimethyl arsinic) acid*

258 gms. sodium hydroxide, 163.2 gms. arsenic trioxide and 960 mls. water were mixed in reactor 1 and allowed to react for 5 minutes. The temperature rose to 176° F. The resulting solution was then pumped to reactor 2 and held at 175° F. The closed system was then pressurized with methyl chloride by means of a compressor; and the system was maintained at 175 p.s.i.g. for 45 minutes, utilizing an appropriate by-pass type pressure control system. Approximately 317 gms. methyl chloride were used while the reaction was proceeding. The reactor was equipped with an agitator which was operated continually to enhance heat and mass transfer. The unreacted methyl chloride gas was then bled off, reducing the reactor pressure to atmospheric. Sulphur dioxide was then bubbled into the closed system for 15 minutes. Approximately 121 gms. sulfur dioxide were introduced into the reactor. The pressure increased to 35 p.s.i.g. and the temperature to 205° F. The solution was then purged by bubbling nitrogen at 20 p.s.i.g. until all remaining unreacted sulfur dioxide was removed.

150.8 gms. sodium hydroxide were dissolved in 200 mls. water and the solution added to the reactor and reacted at about 175° F. The closed system was again pressurized with methyl chloride by means of a compressor and the system maintained at 175° F. and 175 p.s.i.g. for 30 minutes. Approximately 250 gms. methyl chloride were added.

The reactant solution was removed from the reactor and centrifuged in a perforated-basket type centrifuge. 1420 mls. filtrate and 172.7 gms. solids were collected. The filtrate was treated with 77 mls. of 0.8 M sodium hypochlorite at ambient conditions. This solution, which had a pH of 8.15, was acidified with 147 mls. of 20° Bé hydrochloric acid. After acidification, the pH was 4.2 and the volume of liquid was 1630 mls. The acidified solution was then split in half. An 815 ml. aliquot of the solution was evaporated at 230° F. for 2 hours 13 minutes. 546 mls. distillate were collected. The remaining slurry was centrifuged and 173 mls. solution and 184.7 gms. solid collected. The filtrate was approximately 3.7 molar in cacodylic acid. 50 mls. of this filtrate was additionally dried, yielding 37.8 gms. of 67% pure cacodylic acid.

The other 815 mls. aliquot was evaporated at 230° F. for 1 hour and 22 minutes. 500 mls. distillate were collected. The remaining slurry was centrifuged and 216 mls. filtrate and 171.3 gms. solids were collected. The filtrate was approximately 3.3 molar in cacodylic acid.

EXAMPLE 2

*Sodium cacodylate (sodium dimethyl arsinate)*

The process was carried out in a manner similar to Example 1 above up to the final oxidation and acidification steps. In lieu of these steps, a 250 ml. aliquot of the salt solution having a pH of 13 was taken from the filtrate obtained after centrifuging. To this was added 2.4 mls. of concentrated sulfuric acid, bringing the solution pH to 9.5. The solution was concentrated by evaporation of the water and then filtered. 125 mls. distillate, 88 mls. filtrate and 44.5 gms. of solids were collected. The filtrate was found to be a 2.847 molar solution of sodium cacodylate.

EXAMPLE 3

*Sodium cacodylate*

200 grams of sodium hydroxide was dissolved in 250 gms. of water, and the resulting solution was mixed with 1000 mls. of a 4.926 molar cacodylic acid solution under ambient conditions. After neutralization, the solution was filtered and 32.5 gms. of solids removed from the solution. The solution was found by analysis to be a 3.83 molar solution of sodium cacodylate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The process of producing dialkyl arsinic acid compounds with not more than two carbon atoms in the alkyl radicals, comprising the steps of:
   (a) reacting an alkyl arsonate in which the alkyl radical contains not more than two carbon atoms with sulfur dioxide to convert the arsonate to an alkyl arsine oxide;
   (b) reacting the alkyl arsine oxide with an alkali metal hydroxide to convert the oxide to an alkyl arsenite; and
   (c) reacting the alkyl arsenite with an alkyl halide in which the alkyl radical contains not more than two carbon atoms an aqueous solution to convert the arsenite to a dialkyl arsinate.

2. The process as defined in claim 1, together with the step of reacting the dialkyl arsinate with a water soluble oxidizing agent to convert trivalent arsenicals present in the final product to the pentavalent form and thereby rid said product of mammalian toxicity and foul odor.

3. The process as defined in claim 1, together with the step of reacting the dialkyl arsinate with a mineral acid to convert it to the free dialkyl arsinic acid.

4. The process as defined in claim 1, wherein the alkyl arsonate is disodium methyl arsonate, the alkyl halide is a methyl halide, and the end product is sodium dimethyl arsinate.

5. The process as defined in claim 3, wherein the dialkyl arsonate is sodium dimethyl arsonate and the resulting acid is dimethyl arsinic acid.

6. The process as defined in claim 1, including the step of drying the final product.

7. The process as defined in claim 4, wherein said halide is a chloride.

8. The process as defined in claim 1, wherein the alkali metal hydroxide is solid sodium hydroxide.

9. The process of producing sodium dimethyl arsinate from arsenic trioxide, comprising the steps of:
   (a) reacting arsenic trioxide with sodium hydroxide in excess of the stoichiometric amount required for reaction to convert the arsenic trioxide to sodium arsenite;
   (b) reacting the sodium arsenite with superheated methyl chloride to form disodium methyl arsonate;
   (c) reacting the disodium methyl arsonate with sulfur dioxide gas to produce methyl arsine oxide;
   (d) reacting the methyl arsine oxide with sodium hydroxide in excess of the stoichiometric amount to form disodium methyl arsenite and;
   (e) reacting the disodium methyl arsenite in an aqueous solution with superheated methyl chloride to form sodium dimethyl arsinate.

10. The process as defined in claim 9, wherein the sodium arsenite and methyl chloride are reacted at a temperature in the range of 155–185° F. and at a pressure in the range of 105–200 p.s.i.g.

11. The process as defined in claim 10, wherein said temperature is about 175° F. and said pressure is about 175 p.s.i.g.

12. The process as defined in claim 9, wherein the sulfur dioxide is outgassed with an inert gas and a blanket of inert gas is maintained on the reactants while the methyl arsine oxide is converted to disodium methyl arsenite.

13. The process as defined in claim 9, wherein the reaction in paragraph (e) is carried out at a temperature between 75 and 180° F. and at a pressure between 40 and 175 p.s.i.g.

14. The process as defined in claim 13, wherein said temperature is about 175° F. and the pressure is about 150 p.s.i.g.

15. The process as defined in claim 13, including the step of reacting the sodium dimethyl arsinate with a mineral acid to convert it to the free dimethyl arsinic acid.

16. The process as defined in claim 3 together with the step of reacting the free dialkyl arsinic acid with an alkali metal hydroxide to convert the acid to its corresponding alkali metal salt.

17. The process as defined in claim 16, wherein said conversion step is carried out by dissolving said acid in water and mixing the resulting solution with the alkali metal hydroxide.

18. The process of producing dimethyl arsinic acid in a medium substantially free of methyl alcohol, comprising the steps of:
   (a) reacting disodium methyl arsonate with sulfur dioxide to form methyl arsine oxide;
   (b) reacting the methyl arsine oxide with sodium hydroxide in excess of the stoichiometric amount to form disodium methyl arsenite;
   (c) reacting the disodium methyl arsenite in aqueous solution with superheated methyl chloride to form sodium dimethyl arsinate;
   (d) reacting the sodium dimethyl arsinate with hydrochloric acid to form dimethyl arsinic acid; and
   (e) reacting any unreacted trivalent arsenic compounds with sodium hypochlorite to convert the trivalent arsenic compounds to the pentavalent form, thereby reducing mammalian toxicity and ridding the final product of relatively all foul odor.

19. The process of producing a dialkyl arsinic acid with not more than two carbon atoms in each of the alkyl radicals comprising the steps of:
   (a) reacting an alkyl arsonate in which the alkyl radical contains not more than two carbon atoms with sulfur dioxide to convert the arsonate to an alkyl arsine oxide;
   (b) reacting the alkyl arsine oxide with an alkali metal hydroxide to convert the oxide to an alkyl arsenite;
   (c) reacting the alkyl arsenite with an alkyl halide in which the alkyl radical contains not more than two carbon atoms to convert the arsenite to a dialkyl arsinate;
   (d) reacting the dialkyl arsinate with a mineral acid to convert the arsinate to dialkyl arsinic acid; and
   (e) reacting any unreacted trivalent arsenic compounds with a water soluble oxidizing agent to convert the trivalent arsenic compounds to the pentavalent form, thereby reducing mammalian toxicity and ridding the final product of relatively all foul odor;
   (f) the foregoing reactions being carried out in a reaction medium which is substantially free of methyl alcohol.

20. The process of producing a dialkyl arsinic acid compound with not more than two carbon atoms in each of the alkyl radicals, comprising the steps of:
   (a) reacting an alkyl arsonate in which the alkyl radical contains not more than two carbon atoms with sulfur dioxide in aqueous solution to convert the arsonate to an alkyl arsinic oxide;
   (b) adding an alkali metal hydroxide to the solution produced in step *a* and reacting said hydroxide with the alkyl arsine oxide in said solution to convert said oxide to an alkyl arsenite; and
   (c) adding an alkyl halide in which the alkyl radical contains not more than two carbon atoms to the solution produced in step *b* and reacting said halide with the alkyl arsenite in said solution to convert said arsenite to a dialkyl arsinate.

References Cited

UNITED STATES PATENTS 2,442,372   6/1948   Miller et al. _____ 260—442

OTHER REFERENCES

Raiziss et al., Organic Arsenical Compounds, p. 79, ACS Monograph Series (1923).

TOBIAS E. LEVOW, *Primary Examiner.*

E. C. BARTLETT, W. F. W. BELLAMY,
*Assistant Examiners.*